United States Patent
Haldar et al.

(10) Patent No.: US 11,501,340 B2
(45) Date of Patent: Nov. 15, 2022

(54) ENRICHING TAXONOMY FOR AUDIENCE TARGETING AND ACTIVE MODELLING

(71) Applicant: Oracle International Corporation, Redwood Shores, CA (US)

(72) Inventors: Tushar Haldar, Santa Clara, CA (US); Valeriy Protsyk, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 62 days.

(21) Appl. No.: 16/940,656

(22) Filed: Jul. 28, 2020

(65) Prior Publication Data

US 2021/0065247 A1 Mar. 4, 2021

Related U.S. Application Data

(60) Provisional application No. 62/893,588, filed on Aug. 29, 2019.

(51) Int. Cl.
*G06Q 30/02* (2012.01)

(52) U.S. Cl.
CPC ..... *G06Q 30/0271* (2013.01); *G06Q 30/0255* (2013.01); *G06Q 30/0277* (2013.01)

(58) Field of Classification Search
CPC combination set(s) only.
See application file for complete search history.

(56) References Cited

U.S. PATENT DOCUMENTS 8,015,140 B2 * 9/2011 Kumar ............... G06Q 10/04 706/46
10,580,032 B2 3/2020 Wiener et al.
(Continued)

FOREIGN PATENT DOCUMENTS

CN 110378723 A * 10/2019
JP 6125627 B2 * 5/2017 ............ G06Q 30/00
(Continued)

OTHER PUBLICATIONS

L. Ding and Y. Zheng, "Improve E-Commerce Recommendation by Classification Tree and Fuzzy Sets," 2016 International Conference on Identification, Information and Knowledge in the Internet of Things (IIKI), 2016, pp. 457-460, doi: 10.1109/IIKI.2016.73. (Year: 2016).*

(Continued)

*Primary Examiner* — Marie P Brady
(74) *Attorney, Agent, or Firm* — Tarolli, Sundheim, Covell & Tummino LLP

(57) ABSTRACT

A method for identifying a category of offerings can include receiving, by a data management platform (DMP) executing on a computing platform, user data for a user of an end-user device. The method can also include mapping, by the DMP, identifiers (IDs) from received user data for the user to a plurality of different categories of offerings, wherein a particular category of offerings of the plurality of different categories of offerings corresponds to a leading commerce stream executed by the user. The method can also include matching, by the DMP, the category of the leading commerce stream to a second category of offerings for a following commerce stream based on commerce data characterizing a plurality of commerce streams executed in a window of time. The method can further include providing, by the DMP, the second category of offerings.

16 Claims, 6 Drawing Sheets

(56) References Cited

U.S. PATENT DOCUMENTS

| | | | | |
|---|---|---|---|---|
| 2007/0244747 | A1* | 10/2007 | Nikovski | G06Q 30/02 705/14.53 |
| 2010/0049538 | A1* | 2/2010 | Frazer | G06Q 30/0244 705/14.43 |
| 2011/0314092 | A1* | 12/2011 | Lunt | H04L 67/30 715/234 |
| 2013/0117165 | A1* | 5/2013 | Bai | G06F 16/2465 705/28 |
| 2013/0138800 | A1* | 5/2013 | Gelter | H04L 65/80 709/224 |
| 2014/0100986 | A1* | 4/2014 | Linden | G06Q 30/02 705/26.7 |
| 2015/0215236 | A1* | 7/2015 | Joshi | G06F 7/24 707/754 |
| 2016/0292594 | A1 | 10/2016 | Narayanan et al. | |
| 2017/0193561 | A1* | 7/2017 | Shen | G06Q 30/0275 |
| 2019/0102791 | A1 | 4/2019 | Park et al. | |
| 2019/0188771 | A1* | 6/2019 | Rajagopal | G06Q 20/202 |
| 2019/0205939 | A1* | 7/2019 | Lal | G06Q 30/0631 |

FOREIGN PATENT DOCUMENTS

| | | | | |
|---|---|---|---|---|
| KR | 102142126 | B1* | 6/2018 | G06Q 30/02 |
| WO | WO-2015200578 | A1* | 12/2015 | G06Q 30/0239 |

OTHER PUBLICATIONS

Li Niu, Xiao-Wei Yan, Cheng-Qi Zhang and Shi-Chao Zhang, "Product hierarchy-based customer profiles for electronic commerce recommendation," Proceedings. International Conference on Machine Learning and Cybernetics, 2002, pp. 1075-1080 vol.2, doi: 10.1109/ICMLC.2002.1174549. (Year: 2002).*

M. Kirchgessner, V. Leroy, S. Amer-Yahia and S. Mishra, "Testing Interestingness Measures in Practice: A Large-Scale Analysis of Buying Patterns," 2016 IEEE International Conference on Data Science and Advanced Analytics (DSAA), 2016, pp. 547-556, doi: 10.1109/DSAA.2016.53. (Year: 2016).*

J. Katukuri, T. Konik, R. Mukherjee and S. Kolay, "Post-purchase recommendations in large-scale online marketplaces," 2015 IEEE International Conference on Big Data (Big Data), 2015, pp. 1299-1305, doi: 10.1109/BigData.2015.7363885. (Year: 2015).*

D. Kong, J. Tang, Z. Zhu, J. Cheng and Y. Zhao, "De-biased dart ensemble model for personalized recommendation," 2017 IEEE International Conference on Multimedia and Expo (ICME), 2017, pp. 553-558, doi: 10.1109/ICME.2017.8019536. (Year: 2017).*

Dianshuang Wu, J. Lu and G. Zhang, "A hybrid recommendation approach for hierarchical items," 2010 IEEE International Conference on Intelligent Systems and Knowledge Engineering, 2010, pp. 492-497, doi: 10.1109/ISKE.2010.5680827. (Year: 2010).*

X. Chen, Y. Fang, M. Yang, F. Nie, Z. Zhao and J. Z. Huang, "PurTreeClust: A Clustering Algorithm for Customer Segmentation from Massive Customer Transaction Data," in IEEE Transactions on Knowledge and Data Engineering, vol. 30, No. 3, pp. 559-572, Mar. 1, 2018, doi: 10.1109/TKDE.2017.2763620. (Year: 2018).*

Sebastiá Tarin, L.; Garcia Garcia, I.; Onaindia De La Rivaherrera, E.; Guzmán Álvarez, CA. (2009). e-Tourism: a tourist recommendation and planning application. International Journal on Artificial Intelligence Tools. 18(5):717-738. doi:1 0.1142/S0218213009000378.

Mark van Setten; Stanislav Pokraev, Johan Koolwaaij: "Context-Aware Recommendations in the Mobile Tourist Application COMPASS"; found on the internet on Mar. 31, 2020 at: https://www.researchgate.net/publication/221136074_Context-Aware_Recommendations_in_the_Mobile_Tourist_Application_COMPASS.

Montserrat Batet, Antonion Moreno, David Sanches, David Isern, Aida Valls; "Turis@ Agent-based Personalised Recommendation of Tourist Activities"; Expert Systems with Applications 39 (2012) 7319-7329.

* cited by examiner

ENRICHING TAXONOMY FOR AUDIENCE TARGETING AND ACTIVE MODELLING

CROSS-REFERENCE TO RELATED APPLICATION

This application claims the benefit of priority to U.S. Provisional Application No. 62/893,588 filed on 29 Aug. 2019, the entirety of which is herein incorporated by reference.

TECHNICAL FIELD

This disclosure relates to offerings. More particularly, this disclosure relates to systems and methods for providing a category of offerings for a user.

BACKGROUND

Targeted advertising is a form of online advertising that is directed towards audiences with certain traits, based on the product or person the advertiser is promoting. These traits can either be demographic which are focused on race, economic status, sex, age, the level of education, income level and employment or the traits can be psychographic focused which are based on the consumer's values, personality, attitudes, opinions, lifestyles and interests. Such traits can also include behavioral variables, such as browser history, purchase history and other recent activity. Targeted advertising is focused on certain traits and the consumers who are likely to have a strong preference will receive the message instead of those who have no interest and whose preferences do not match an offering's attribute.

Some forms of advertising, including billboards, newspapers, magazines and radio, are progressively becoming replaced by online advertisements. Information and communication technology (ICT) space has transformed over recent years, resulting in targeted advertising to stretch across all ICT technologies, such as web, streaming video and mobile environments.

Behavioral targeting is centered around the activity/actions of users, and is often achieved on web pages. Information from browsing websites can be collected from data mining, which finds patterns in users search history. As an example, if a consumer was frequently searching for plane ticket prices, the targeting system would recognize this and start showing related advertisements across unrelated websites, such as airfare deals on social media platforms. Such advertisements target an individual's interests, rather than target groups of people whose interests may vary.

A data management platform (DMP) is a technology platform used for collecting and managing data, mainly for digital marketing purposes. A DMP can be employed to generate audience segments, which are used to target specific users in online advertising campaigns. The DMP can use big data and/or machine learning algorithms to process big data sets about users from various sources. A DMP can collect data via tags. In addition to gathering first-party data, in some examples, a DMP can enrich data for an entity with location and third-party audience data provided by data suppliers. Further, in some examples, a DMP can have audiences categorized as segment trees which are targeted based on campaigns or strategies. The tag of data can be employed as a signal for interest that can be evaluated or matched for campaigns and/or strategies which are composites of segments matching tree nodes. These matched campaigns and/or strategies are employable to provide offerings to end users.

SUMMARY

One example relates to a method for identifying a category of offerings. The method can include receiving, by a data management platform (DMP) executing on a computing platform, user data for a user of an end-user device. The method can also include mapping, by the DMP, identifiers (IDs) from received user data for the user to a plurality of different categories of offerings, wherein a particular category of offerings of the plurality of different categories of offerings corresponds to a leading commerce stream executed by the user, wherein the leading commerce stream corresponds to a first offering ordered by the user. The method can also include matching, by the DMP, the particular category of the leading commerce stream to a second category of offerings for a following commerce stream based on commerce data characterizing a plurality of commerce streams executed in a window of time. The method can further include providing, by the DMP, the second category of offerings for the following commerce stream.

Another example relates to a DMP for identifying a category of offerings. The DMP can include a DMP preprocessing computing platform having a computer readable program stored in a non-transitory machine-readable medium that causes the program to preprocess commerce data characterizing a plurality of executed commerce streams, wherein each executed commerce stream corresponds to a given offering ordered for a given category of offerings. The DMP preprocessing computing platform can also identify a temporal correlation between at least two categories of offerings based on the executed commerce streams. The DMP can also include a DMP real time processing computing platform having a computer readable program stored in a non-transitory machine-readable medium that causes the program to map identifiers (IDs) from received user data for a user to a plurality of different categories of offerings, wherein a particular category of offerings of the plurality of different categories of offerings corresponds to a leading commerce stream executed by the user, wherein the leading commerce stream corresponds to a first offering ordered by the user. The DMP real time processing computing platform can also match the particular category of the leading commerce stream to a second category of offerings for a following commerce stream based on commerce data characterizing a plurality of commerce streams executed in a window of time and provide the second category of offerings for the following commerce stream.

Yet another example relates to a method for identifying a category of offerings. The method can include preprocessing, by the DMP, commerce data characterizing a plurality of executed commerce streams, wherein each executed commerce stream corresponds to a given offering ordered for a given category of offerings. The method can also include identifying, by the DMP, a temporal correlation between at least two categories of offerings based on the executed commerce streams receiving, by the DMP, user data for a user of an end-user device. The method can further include mapping, by the DMP, identifiers (IDs) from received user data for the user to a plurality of different categories of offerings, wherein a particular category of offerings of the plurality of different categories of offerings corresponds to a leading commerce stream executed by the user, wherein the leading commerce stream corresponds to a first offering ordered by the user. The method can yet further include matching, by the DMP, the category of the leading commerce stream to a second category of offerings for a following commerce stream based on commerce data characterizing a plurality of commerce streams executed in a window of time. Still further, the method can include providing, by the DMP, the second category of offerings for the following commerce stream to an offering server, wherein the offering server provides a particular offering that is categorized in the second category to a web server accessed by the end-user device.

DETAILED DESCRIPTION

This disclosure relates to systems and method for active predictive modeling for targeted segments employable for advertisements of offerings utilizing a commerce stream analysis and ranking of taxonomy (e.g., ranking of categories) to exhibit relationships between non-related taxonomy hierarchies. Such enriched taxonomy could be utilized as a predictive model to surmise a user's interest for a next purchase of an offering.

As an example, the systems and methods described herein include a data management platform (DMP) that identifies an offering purchased by a user in a prior commerce stream, and the DMP can identify a category of the offering. Moreover, the DMP analyzes commerce data of other completed commerce streams to identify correlations between categories of offerings. For instance, the commerce data may indicate that users that have executed a commerce stream for an offering (e.g., purchased the offering) directed to a vacation in central Florida, of the United States tend to purchase chewing gum within four (4) months. Thus, the DMP can determine that the category of chewing gum is correlated to the category of vacations in central Florida. Accordingly, a website requesting information to facilitate advertising to a user that has executed a commerce stream within the category of vacation to central Florida may be provided a category of chewing gum, such that the user may be provided an advertisement for a specific brand of chewing gum. By implementing the systems and methods described herein, the relevance of advertisements provided to users can be elevated, which in turn can elevate user engagement and/or interest.

Figure 1:
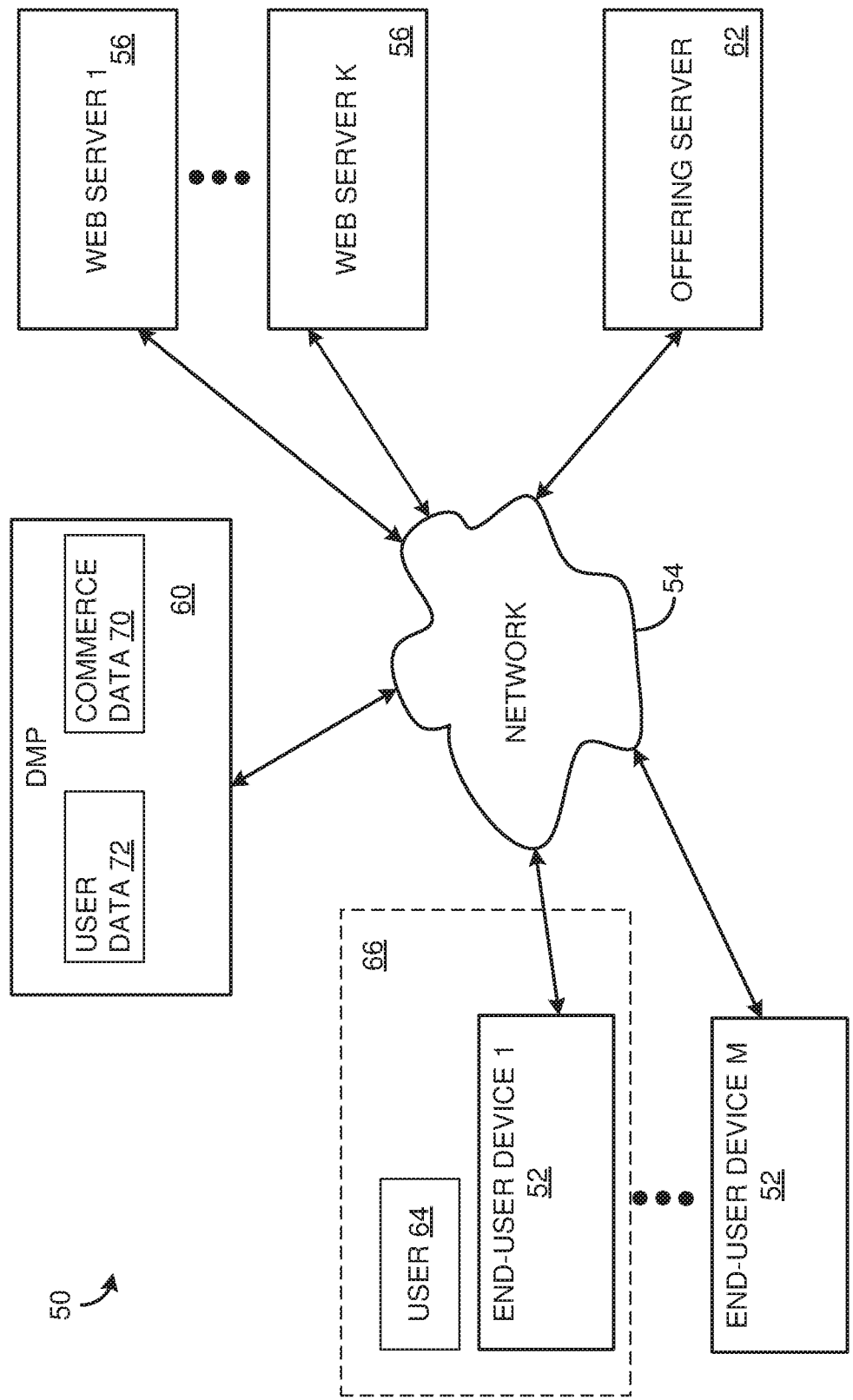
FIG. 1 illustrates an example of a system for enriching taxonomy of categories for offerings to elevate relevance of targeted offerings to a user employing an end-user device.

FIG. 1 illustrates an example of a system 50 configured to enrich taxonomy of categories for offerings to elevate relevance of targeted offerings to a user employing an end-user device 52. The system 50, as illustrated, includes various computing systems (e.g., servers and devices) interconnected by a network 54. The network 54 can be implemented as any combination of a wide area network (e.g. WAN), local area network (e.g. LAN), cellular network, wireless LAN (e.g. WLAN), or any such mechanisms for enabling communication of computing systems. Portions of the network 54 can be wired or wireless. Moreover, the network 54 can be a public network, such as the Internet, a private network or a combination thereof (e.g., a virtual private network). The system 50 includes K number of web servers 56 that communicate on the network 54, where K is an integer greater than or equal to one. The system 50 also includes a data management platform 60 (DMP) that can be implemented as a server, as well as an offering server 62. The offering server 62 can be employed to implement an ad server, which may also be referred to as an advertisement server. In some examples, the offering server 62 may be integrated with each of the K number of web servers 56 (or some subset thereof).

The K number of web servers 56, the DMP 60 and the offering server 62 can include a memory implemented as a non-transitory machine-readable medium (e.g., random access memory) with machine-readable instructions stored in such medium. The K number of web servers 56, the DMP 60 and the offering server 62 can also include a processing unit (e.g., one or more processor cores) for accessing the memory and executing the machine-readable instructions. Moreover, the servers illustrated in FIG. 1, including each of the K number of web servers 56 (or some subset thereof), the DMP 60 and the offering server 62 could be implemented in a computing cloud. In such a situation, features of each component, such as the processing unit, the network interface and the memory could be representative of a single instance of hardware or multiple instances of hardware with applications executing across the multiple of instances (i.e., distributed) of hardware (e.g., computers, routers, memory, processors, or a combination thereof). Alternatively, each of the K number of web servers 56, the DMP 60 and the offering server 62 could be implemented on a single dedicated server.

The system includes M number of end-user devices 52, where M is an integer greater than or equal to one. In some examples, there can be thousands or even millions of end-user devices 52. Each end-user device 52 can represent one of a variety of computing devices (e.g., a desktop computer, a laptop computer, a smart phone, a tablet computer, etc.) having hardware and software (e.g. web browser application) capable of processing and displaying information (e.g., web page, graphical user interface, etc.), and communicating information (e.g., web page request, user activity, campaign settings, etc.) over the network 54. A representative instance of a user 64 operating a particular instance of the end-user device 52 is also shown in the system 50, indicated by the box 66.

In some examples, there can be thousands or millions of end-user devices 52. In such an example, the M number of end-user devices 52, the K number of web servers 56, the DMP 60 and the offering server 62 can exhibit a set of high-level interactions (e.g., operations, messages, etc.) in a protocol. Specifically, users of each of the M number of end-user devices 52 (or some subset thereof) can initiate a browsing session with one of the K number of web servers 56, such that a request for a session is sent to a particular instance of a web server 56, namely a given web server 56. The given web server 56 can respond to a requesting end-user device 52 by transmitting a web page to the requesting end-user device 52. The web page can be a document deploying hypertext markup language (HTML) formatting, or other such known or standard formatting and including content to be displayed by the requesting end-user device 52. The web page content defines the various elements (e.g., text boxes, buttons, hyperlinks, images, animations, forms, etc.) that will appear on the requesting end-user device 52 when a web page is rendered by a web browser executing on the requesting end-user device 52.

In some examples, content provided by the given web server 56 can include software instructions (e.g., scrips, such as JavaScript, JScript, ECMAScript, VBScript, Java, etc.) to perform various tasks. As an example, such scripts can be executed on either one of the K number of web servers 56 (e.g., in a server-side operation) or on the requesting end-user device 52 to dynamically modify the contents of the web page (e.g. to display or not display certain content based on certain criteria) as displayed on the requesting client device 52. Further, in some examples, the scripts can monitor the browsing activity of a user employing the requesting end-user device 52 and the scripts can conditionally execute operations in response to a certain set of user input (e.g. entered text, dropdown selections, radio button selections, checkbox selections, etc.). As an example, the user input can be processed to dynamically fill out other parts of a form on the web page provided based on the existing inputs, or validate that the inputs conform to certain formats or rules. The user input can also include other types of input that can be used by the scripts such as document object model (DOM) events or any other event that are initiated in response to the user input (e.g. mouse events, keyboard events, HTML form/frame events, progress events, etc.). Such DOM events can include, but are not limited to mouse button clicks and double-clicks, content mouseovers, content drags, page loads, page scrolls, page resize, activity progress, etc.

In some examples, a combination of elements included in the web page provided by the given web server 56 can contain an advertisement or call to action for the user of the requesting end-user device 52. In some examples, in response to the requesting end-user device 52, a series of web pages can be employed to execute a commerce stream for an offering. As used herein, an "offering" represents good and/or services in commerce. Thus, in the context of the present disclosure, execution of a commerce stream can represent the completing of an ordering (e.g., purchasing) of good and/or services. It is noted that this list and any other and/or list is intended to disclose both disjunctive and conjunctive embodiments. As an example, execution of a first commerce stream can include purchasing plane tickets for a trip. As another example, execution of a second commerce stream can include purchasing merchandise such as shoes. As another example, a third commerce stream could include the purchase of software or electronic media (e.g., e-books). In some examples, the offering (such as the plane tickets or the shoes) may be consumed or delivered at a later date. In other examples, the offering (e.g., software or e-books) may be delivered at the same time (or nearly the same time) as the order for the offering is executed.

In some examples, an offering executed through a commerce stream may be a member of a category that has a hierarchical relationship to other categories for other offerings. For instance, if a given web server 56 represents a retail store, a first web page could provide a root listing that includes a list of categories (e.g., books, tools, clothing, etc.). In such an example, a second web page (resulting from selection of a category) could provide another list of categories (e.g., subcategories) and/or offerings. Thus, selection of a first category could provide a list of second categories and/or offerings. Similarly, selection of a second category could provide a list of third categories (e.g., subcategories) and/or offerings. For example, if the selected category represents books, a first category could represent fiction and a second category can represent science fiction. In this situation, the offering could be a particular science fiction book, that is a member of the second category, the first category and the selected category.

In the examples described, it is presumed that each of the K number of web servers 56 has subscribed to services offered by the DMP 60 to enrich the taxonomy of categories for offerings for users of the M number of end-user devices 52. Accordingly, upon execution of a commerce stream with a given web server 56, the given web server 56 transfers information to the DMP 60 related to the commerce stream. Such information can include, for example, an identity of the offering, categories of the offering and/or information related to the user employing the corresponding end-user device 52.

Over time, many instances of commerce streams can be executed. As noted, there can be thousands or millions of end-user devices 52. Therefore, there can be thousands or millions of commerce streams executed over a given time period (e.g., months or years), wherein the DMP 60 can receive information for each such commerce stream or some subset thereof. The DMP 60 can store the information for each commerce stream in a data structure, such as a database. Collectively, information related to the commerce streams can be stored in commerce data 70. Such commerce data 70 can include profiles for categories of offerings and some such category profiles can include information characterizing relationships to other categories for other offerings. The DMP 60 can preprocess the commerce data 70 to organize the commerce data 70 as a table or database.

Additionally, the DMP 60 can collect and store user data 72 in a data structure (e.g., a database or table). The user data 72 can include information that enables the DMP 60 to identify which (and when) commerce streams have been executed by a given user. For example, the user data 72 can include a user profile for each user (or some subset thereof) and each user profile can identify categories for a stream of commerce executed by a particular user at a specific time and date. For instance, the user data 72 can include a user profile indicating that a particular user purchased a science fiction book at a specific date and time.

During preprocessing operations, the DMP 60 can include an algorithm (e.g., as a script) that can analyze the commerce data 70 and corresponding information related to each of the executed commerce streams (provided by the K number of web servers 56) to identify time dependent correlations between categories of offerings for executed commerce streams. As an example, analysis of the commerce data might reveal that 80% of users that purchased a saw also purchase an industrial hand cream within two months. In such a situation, the DMP 60 can and identify and store data characterizing the correlation in the data structure. More particularly, the DMP 60 can store information that indicates that the commerce stream for the purchase of an offering in the category of saw is a leading commerce stream for the commerce stream for a category that includes the industrial hand cream, which can be referred to as a following commerce stream. Stated differently, the purchase of the saw is a leading commerce stream and the purchase of the industrial hand cream is a following commerce stream relative to each other.

Further, there can be multiple following commerce streams for a single commerce stream. For instance, continuing with the example of a commerce steam for the purchase of a saw, the analysis of the commerce data may reveal that within 5 months of purchasing a saw, 70% of the of the users that purchases a saw also purchased an offering in the category of shelf. In such a situation, the commerce stream for the purchase of the industrial hand cream and the commerce stream for the purchase of the shelf are both following commerce streams of the (leading) commerce stream of the purchase of the saw.

More specifically, the DMP 60 can rank relationships between categories in the commerce data. In the examples described herein, the rank can be based on analyzed tendencies of other users. For instance, continuing with the above examples, the DMP 60 may rank a category of shelf higher than a category of a closer neighbor (e.g., a category of screwdriver) in a hierarchical structure in situations where the saw has been purchased. Such ranking can be used to augment and/or replace other ranking of relationships of categories of offerings.

At a subsequent time, the user 64 can employ the end-user device 52 (indicated by the box 66) to access a web server 56. More specifically, the end-user device 52 can establish a web session with a first web server 56 in response to user input from the user 64. In a first example (hereinafter, "the first example"), it is presumed that the user 64 employs the first end-user device 52 (end-user device 1) to access the first web server 56. The first web server 56 can be any instance of the K number of web servers 56. The first web server 56 can provide information to the DMP 60 identifying the user 64 (e.g., data extracted from a web cookie). In the first example, it is presumed that the user 64 provides user input to the end-user device 52 and executes a first commerce stream to purchase a saw. In response to execution of the first commerce stream, the first web server 56 provides the information characterizing the first commerce stream to the DMP 60. In response to such information, the DMP 60 can generate and/or update a user profile for the user 64 stored in the user data 72, indicating that the user has executed a commerce stream for an offering that is a member of the category, saw.

More particularly, in the first example, the first web server 56 can provide information to the DMP 60 identifying the user 64 and the first commerce stream to the DMP 60 through Hypertext Transfer Protocol (HTTP) message. In this situation, a header of the HTTP message, namely, an HTTP header can include a key-value pair that corresponds to a user identify and a category of commerce. For instance, in the first example, the HTTP header could include the key value pairs listed in Table 1. In Table 1, continuing with the first example, it is presumed that the Value '35874' could correspond to table saws. Additionally, in Table 1, continuing with the first example, the value "15789739287" could identify a particular user.

TABLE 1

| Key | Value |
|---|---|
| 928759871 | 35874 |
| 357871651 | 15789739287 |

Further, continuing with the first example, at another subsequent time (e.g., days, weeks or months) after executing the first commerce stream, the user 64 can access a second web server 56. The second web server 56 can be implemented as the same or a different web server 56 as the first web server 56. In response to accessing the second web server 56, the second web server 56 can provide user data identifying the user 64 of the end-user device 52 to the DMP 60 in a commerce signal (e.g., a purchase signal). As one example, the commerce signal can include identifiers (IDs) that can uniquely identify the user. Continuing with the first example, the commerce signal can be an HTTP message with an HTTP header that includes a key value pair, such as the key value pair "357871651" (key) and "15789739287" of Table 1.

In response, the DMP 60 can execute real-time operations (e.g., operations that complete in under 50 milliseconds) and access the user data 72 to map which (if any) categories of commerce streams that been executed by the user 64. In the first example, it is presumed that the user 64 purchased the saw less than one (1) month ago during execution of a commerce stream. The DMP 60 accesses the commerce data 70 to map a category for an offering for a following commerce stream correlated to the leading commerce stream (e.g., the purchase of the saw). In the first example, it is presumed that the DMP 60 maps the category of the commerce stream corresponding to the industrial hand cream and the category for the commerce stream corresponding to the shelf as being categories of following commerce streams.

The DMP 60 can provide a notification to the offering server 62 of the identified category (or multiple categories) for the following commerce stream of the leading commerce stream. In response, the offering server 62 can identify a specific offering that corresponds to the following commerce stream of the leading commerce stream. In the first example, the offering server 62 can identify a specific shelf brand/model, which is a member of a shelf category and/or a specific brand of industrial hand cream, which is a member of an industrial hand cream category.

In some example, the offering server 62 can return the specific offerings to the DMP 60. In response, in some examples, the DMP 60 can provide the second web server 56 with information characterizing the identified specific offering. In other examples, the offering server 62 can provide the second web server 56 the information identifying the specific offering directly. In still other examples, the second web server 56 and the offering server 62 can be integrated. In any such situation, in response to the identity of the specific offerings, the second web server 56 can generate an advertisement for the specific offering (or multiple specific offerings). As some examples, the advertisement can include a hyperlink. In such a situation, actuation of the hyperlink can initiate execution of a commerce stream for the specific offering. In other examples, the advertisement may be implemented as a banner ad. Thus, in this situation, the hyperlink may direct the first end-user device 52 to another web server 56 where the commerce stream for the specific offering can be executed. In this situation, the other web server 56 may compensate the second web server 56 for a referral (e.g., a click fee).

Expediency is paramount when generating the webpage for the end-user device 52. User interest rapidly decays the longer that a webpage takes to load. For example, user interest remains constant for a relatively short time (e.g., about 2 seconds), which short time can be referred to as a user interest time window. After the user interest time window expires (e.g., about 2 seconds), every second added amounts to an increasing tendency towards page abandonment by the user 64. Accordingly, the DMP 100 selects operations needed for the end-user device 52 to output the webpage to the user 64 based on computational efficiency. Additionally, some delays, such as web page rendering, Internet bandwidth, and content delivery factors, such as proximity to data centers, and performance of backend systems may be outside a locus of control of the DMP 60. For example, a significant portion of the user interest time window (e.g., 2 seconds) may be allocated to packet flight time. Thus, the operations on the DMP 60 are selected to avoid contributing to delaying the outputting of the webpage by the end-user device 52 more than the user interest time window. Accordingly, real-time operations selected in the DMP 60 for providing an offering to a requesting web server 56 can be completed in under 50 milliseconds (e.g., 20-30 milliseconds), which accounts for about 2.5% or less of the user interest time window (e.g., 2 seconds).

As noted, the DMP 60 can execute preprocessing of user data to map user interests to different categories of offerings. Additionally, the DMP 60 can execute real-time operations (e.g., operations that complete in less than 50 milliseconds) to provide an offering to a requesting web server 56. Accordingly, the DMP 60 can be representative of a cloud computing platform with multiple parallel computing platforms operating in parallel that can access a shared memory. In particular, operations related to the preprocessing of the commerce data 70 and the user data 72 can be implemented on a set of computing platforms with resources sufficient to thoroughly parse the commerce data 70 and the user data 72 over time and to write the commerce data 70 and the user data 72 to the shared memory.

Additionally, the real-time operations of the DMP 60 needed to provide the offering to the requesting web server 56 can be executed on a lightweight computing platform, such as a computing platform executing Linux or other simple operating system that can access the shared memory. In such a situation, the number of lightweight computing platforms of the DMP 60 executing the real-time operations can be scaled to meet user demand. For instance, there may be thousands or millions of end-user devices 52 requesting new web pages contemporaneously. Thus, the number of lightweight computing platforms executing the real-time operations of the DMP 60 can be easily scaled to meet such requests.

By employment of the system 50, relevant offerings can be determined for users of the end-user devices 52 while curtailing the number of times that the user interest time window for loading a web page (e.g., 2 seconds) is exceeded. More particularly, the DMP 60 is programmed/configured to identify a category of a leading commerce stream previously executed for the user. Based on the category of the leading commerce stream and a time period, the DMP 60 is configured to identify a category for a following commerce stream. Moreover, the offering server 62 is configured to identify a specific offering (e.g., goods or services) based on the identified category of the following commerce stream, and an advertisement for the specific offering can be provided to the user by the web server 56. Accordingly, the user 64 has an elevated likelihood of purchasing the offering corresponding to the category of the following commerce stream, relative to an advertisement for a random offering or an advertisement for an offering corresponding to the category of the leading commerce stream.

Figure 2:
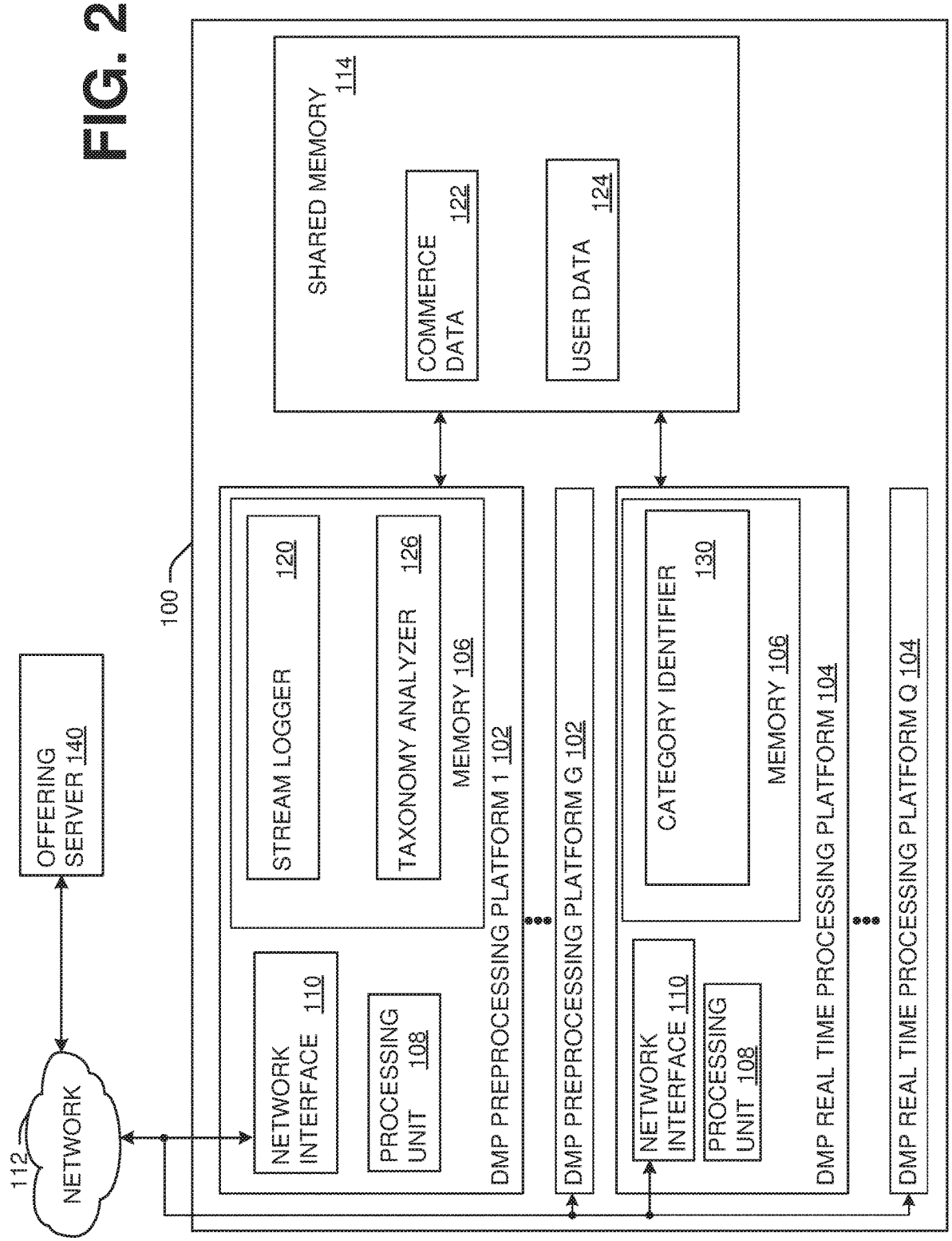
FIG. 2 illustrates an example of a data management platform (DMP) for enriching taxonomy of categories for offerings to elevate relevance of targeted offerings to a user.

FIG. 2 illustrates an example of a DMP 100 that could be employed to implement the DMP 60 in FIG. 1. The DMP 100 could be implemented, for example in a computing cloud. Thus, operations of the DMP 100 can be distributed among a plurality of computing platform operating in parallel. More particularly, the DMP 100 can include G number of DMP preprocessing platforms 102 and K number of DMP real time processing platforms 104 operating in parallel, wherein G and Q are both integers greater than or equal to one. Moreover, for purposes of simplification of explanation, only the details of the first DMP preprocessing platform 102 (labeled "DMP PREPROCESSING PLATFORM 1" in FIG. 2) and the first DMP real time processing platform 104 (labeled "DMP REAL TIME PROCESSING PLATFORM 1" in FIG. 1) are illustrated. However, each of the instances of the second to Gth DMP preprocessing platforms 102 and the second to Qth DMP real time processing platforms 104 can be implemented in similar manners.

In the example illustrated, the G number of DMP preprocessing platforms 102 and the Q number of DMP real time processing platforms 104 can be representative of individual computing platforms that can operate in parallel. In this situation, each of the G number of DMP preprocessing platforms 102 and each of the Q number of DMP real time processing platforms 104 can include a memory 106 that could be implemented, for example, as non-transitory machine-readable media, such as volatile memory (e.g., random access memory), nonvolatile memory (e.g., a hard disk drive, a solid state drive, flash memory, etc.) or a combination thereof. The G number of DMP preprocessing platforms 102 and the Q number of DMP real time processing platforms 104 can also include a processing unit 108 to access the memory 106 and execute the machine-readable instructions. Each processing unit 108 can include, for example, one or more processor cores. The G number of DMP preprocessing platforms 102 and the Q number of DMP real time processing platforms 104 can include a network interface 110 configured to communicate with a network 112. The network interface 110 could be implemented, for example, as a network interface card. The network 112 could be implemented for example, as a public network (e.g., the Internet), a private network (e.g., proprietary network), or a combination thereof (e.g., a virtual private network).

As noted, the DMP 100 could be implemented, for example in a computing cloud. In such a situation, features of the DMP 100, such as the processing units 108, the network interfaces 110 and the memories 106 could be representative of a single instance of hardware or multiple instances of hardware with applications executing across the multiple of instances (i.e., distributed) of hardware (e.g., computers, routers, memory, processors, or a combination thereof). Alternatively, the DMP 100 could be implemented on a single dedicated server.

In some examples, the G number of DMP preprocessing platforms 102 and the Q number of DMP real time processing platforms 104 can be implemented with disparate resources. For example, the processing unit 108 of a given DMP preprocessing platform 102 may have more cores than a processing unit 108 of a given DMP real time processing platform 104. Additionally or alternatively, there may be more DMP real time processing platforms 104 implemented than DMP preprocessing platforms 102.

The DMP 100 can include a shared memory 114 that can store data and/or machine-readable instructions that are accessible by the G number of DMP preprocessing platforms 102 and the Q number of DMP real time processing platforms 104. The shared memory 114 could be implemented, for example, as non-transitory machine-readable media, such as volatile memory (e.g., random access memory), nonvolatile memory (e.g., a hard disk drive, a solid state drive, flash memory, etc.) or a combination thereof.

The memory 106 of the G number of DMP-preprocessing platforms 102 can store machine-readable instructions for transactions to facilitate the preprocessing of a taxonomy of the transactions. More particularly, the memory 106 of the G number of DMP-preprocessing platforms 102 can include a stream logger 120. The stream logger 120 can receive information characterizing users accessing a web server (e.g., one of the K number of web servers 56 of FIG. 1). Additionally, the stream logger 120 can receive information characterizing executed commerce streams from the web server. Such information for the commerce stream can include, but is not limited to, an identity of the user executing the commerce stream, information identifying the ordered offering, a time and date that the commerce stream is executed and/or a category of the offering. In some examples, the information for the user data and/or the commerce stream can be embedded in an HTTP request, such as in an HTTP header. For instance, the user data and/or the commerce stream can be implemented as key value pairs in the HTTP header, such as the key value pairs of Table 1. The stream logger 120 can store information characterizing the commerce stream in commerce data 122 that is stored in the shared memory 114. The commerce data 122 can be stored and/or preprocessed (e.g., organized) in a data structure, such as a database or table.

Additionally, the stream logger 120 can store information related to the user that executed the commerce stream in a user profile of the user data 124. In particular, each user profile in the user data 124 can include information that identifies the user, as well as information identifying commerce streams (including the associated categories) that are executed by the user and the time and date such streams were executed. This process can be repeated for each commerce stream received by the stream logger 120. Thus, over time (e.g., weeks, months or years), the commerce data 122 can include information for thousands or millions of executed commerce streams. Similarly, the user data 124 can include user profiles for thousands or millions of users.

The memory 106 of the G number of DMP-preprocessing platforms 102 can store machine-readable instructions for a script to execute preprocessing of the taxonomy of the commerce streams. More particularly, the memory 106 of the G number of DMP-preprocessing platforms 102 can include a taxonomy analyzer 126. The taxonomy analyzer 126 can analyze the commerce data 122 of the shared memory 114 to identify correlations between categories that are employable to execute commerce streams. More particularly, the taxonomy analyzer 126 employs active modeling to identify a temporal relationship between a category for leading commerce stream and a category for a following commerce stream.

Figure 3:
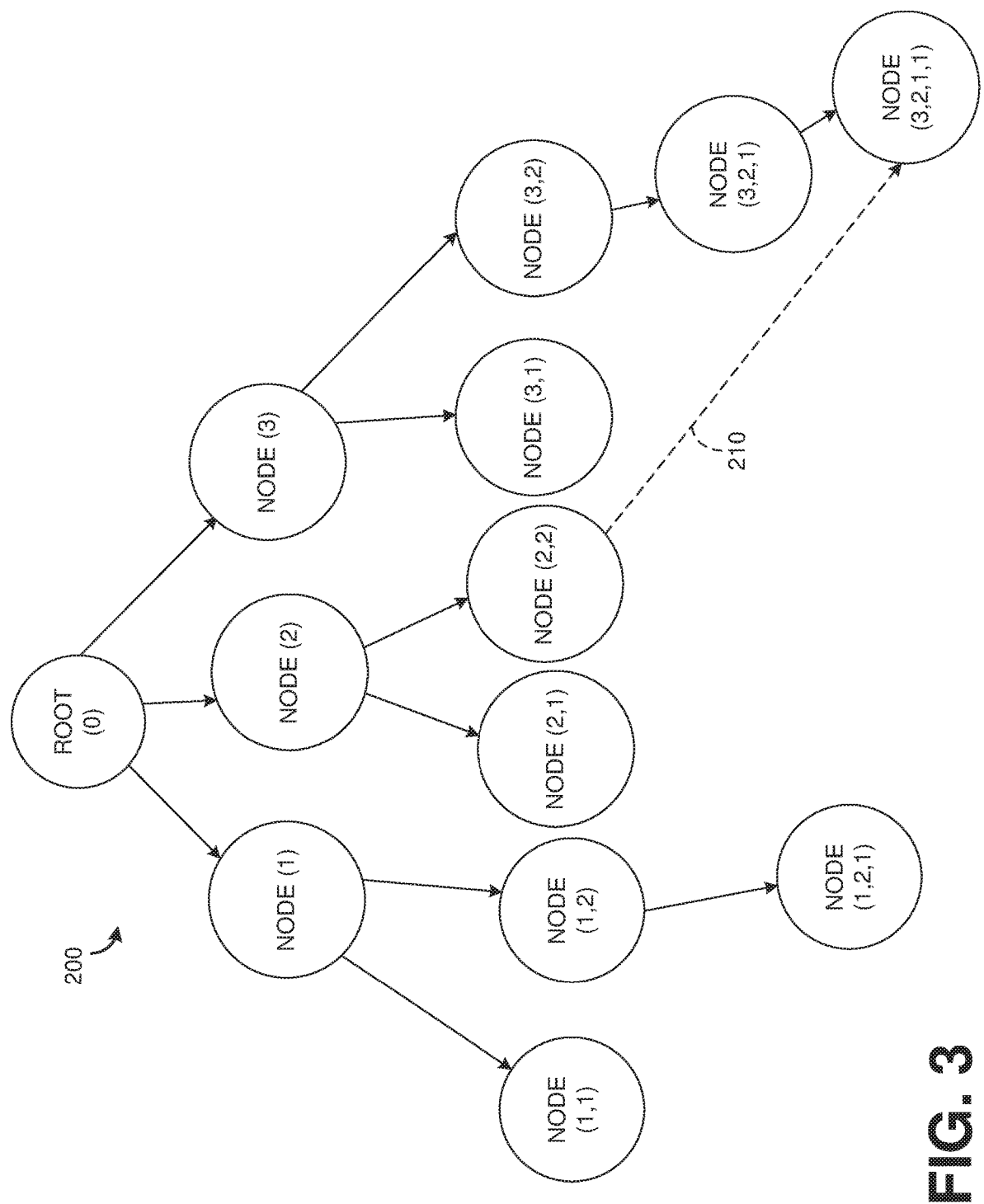
FIG. 3 illustrates a tree diagram with a hierarchy of nodes representing categories of offerings.

FIG. 3 illustrates a tree diagram 200 depicting a hierarchical relationship between nodes representing a taxonomy tree for a retail system. In some examples, each node can represent a category of offerings for the retail system. Moreover, each node includes a unique index number. The tree diagram 200 includes a root node, labeled as root (0), which is considered the 0th level. A first level of branch nodes has single dimensional node numbers, specifically 1 . . . 3. Nodes at the second through last levels have identifiers that X number of indices, where X is the level on the tree and each index number identifies parent nodes of the nodes. As an example, node (3, 1) has two indices, 3 and 1, indicating that the node (3, 1) is a first child node of node (3). Similarly, node (3, 2, 1) has three indices, 3, 2 and 1, indicating that the node (3, 2, 1) is a third level node, and that node (3, 2, 1) is a child of node (3) and node (3, 2). It is noted that in other examples, other index numbers (including a single number) are possible.

To calculate a hierarchical distance between two nodes in the tree diagram 200, the number of branches from the deeper node to a common node are counted. For example, node (1, 2, 1) and node (2, 2) have a distance of three since there are three branches between nodes (1, 2, 1) (the deeper node) and node (0) (the common node).

As noted, in the example of the tree diagram 200 of a retail system, each node can represent a category for offerings. In a second example (hereinafter, "the second example"), Table 2 provides a list of possible categories that could represent the nodes of the tree diagram 200.

TABLE 2

| COUNT | NODE | VALUE |
| --- | --- | --- |
| 1 | (1) | AUTOMOBILE |
| 2 | (1, 1) | AUTOMBILE BRAND 1 |
| 3 | (1, 2) | AUTOMOBILE BRAND 2 |
| 4 | (2) | TRAVEL |
| 5 | (2, 1) | TRAVEL HAWAII |
| 6 | (2, 2) | TRAVEL SINGAPORE |
| 7 | (3) | FOOTWEAR |
| 8 | (3, 1) | FORMAL FOOTWEAR |
| 9 | (3, 2) | CASUAL FOOTWEAR |
| 10 | (3, 2, 1) | SLIPPERS |
| 11 | (3, 2, 1, 1) | RAIN WATER SLIPPERS |

The taxonomy analyzer 126 of the DMP preprocessing platforms 102 can employ Equation 1 to determine a relationship between two nodes in the tree diagram 200 for a selected time period based on executed commerce streams. In the second example, as illustrated by the arrow 210, there is a correlation between the commerce stream for node (2, 2) and the commerce stream for node (3, 2, 1, 1). More particularly, in the second example, users that execute a commerce stream for the category travel to Singapore have are also likely to execute a commerce stream to purchase an offering in the category of rain water slippers for a selected time period of one month.

$$R(c1 \rightarrow c2) = \text{floor}\left(\left(\left[\left(\frac{1 - (\% \ UR * \% \ AV)}{N - 1}\right) * D\right] * N - 1\right) + 1\right) \quad \text{Equation 1}$$

Wherein:
N is the total number of nodes (categories) in the tree diagram;
D is the hierarchical distance between the first node and the second node;
c1 is a first node (a first category);
c2 is a second node (a second category);
R is a quantified ranked relationship between the leading commerce (c1) stream for the first node and the following commerce stream (c2) for the second node;
% UR is the percent of the total users within the user data (e.g., the user data 124 of FIG. 1) for which user data was captured;
% AV is the percent of the number of users of the total number of users that executed both the leading commerce stream for the first node and the following commerce stream for the second node.

Continuing with the second example, it is presumed that over one month (e.g., May) that there were 1000 users, wherein 60% of user data was captured (e.g., % UR=0.6) and 90% of that 60% ordered rain water slippers (node (3, 2, 1, 1)) after ordering a trip to Singapore (node (2, 2); e.g., % AV=0.9). Additionally, there are 11 nodes in the tree diagram 200, corresponding to 11 categories, (e.g., N=11) and the distance between node (2, 2) and node (3, 2, 1, 1) is four (e.g., D=4). Thus, in this instance of the second example, the quantified ranked relationship, R would be 2, wherein a lower number indicates a stronger correlation.

Still continuing with the second example, it is presumed that over another month (e.g., June) there were 1000 users, wherein 25% of user data was captured (e.g., % UR=0.3), and 90% of that 30% ordered rain water slippers (node (3, 2, 1, 1)) after ordering a trip to Singapore (node (2, 2); e.g., % AV=0.9). In this month (e.g., June), the quantified ranked relationship, R would be 4, which is equal to a hierarchical distance between the first node (node (3, 2, 1, 1) and the second node (2, 2)). Further, in some examples, additional weighting factors can be applied the calculate the correlation between nodes.

Referring back to FIG. 2, as demonstrated, over time, the correlation between categories based on executed commerce streams are mapped by the taxonomy analyzer 126. Moreover, the results of the taxonomy analysis can be written to the commerce data 122 of the shared memory 114. Thus, some (or all) categories of offerings included in the commerce data 122 can be a leading commerce stream for another (following) commerce stream of another category. Thus, in the second example, a record (or other data) associated with the category representing node (2, 2) (e.g., travel to Singapore) could include an indication of the correlation (e.g., the quantified rank, R) to the category node (3, 2, 1, 1) based on the identified relationships between corresponding commerce streams.

Figure 4:
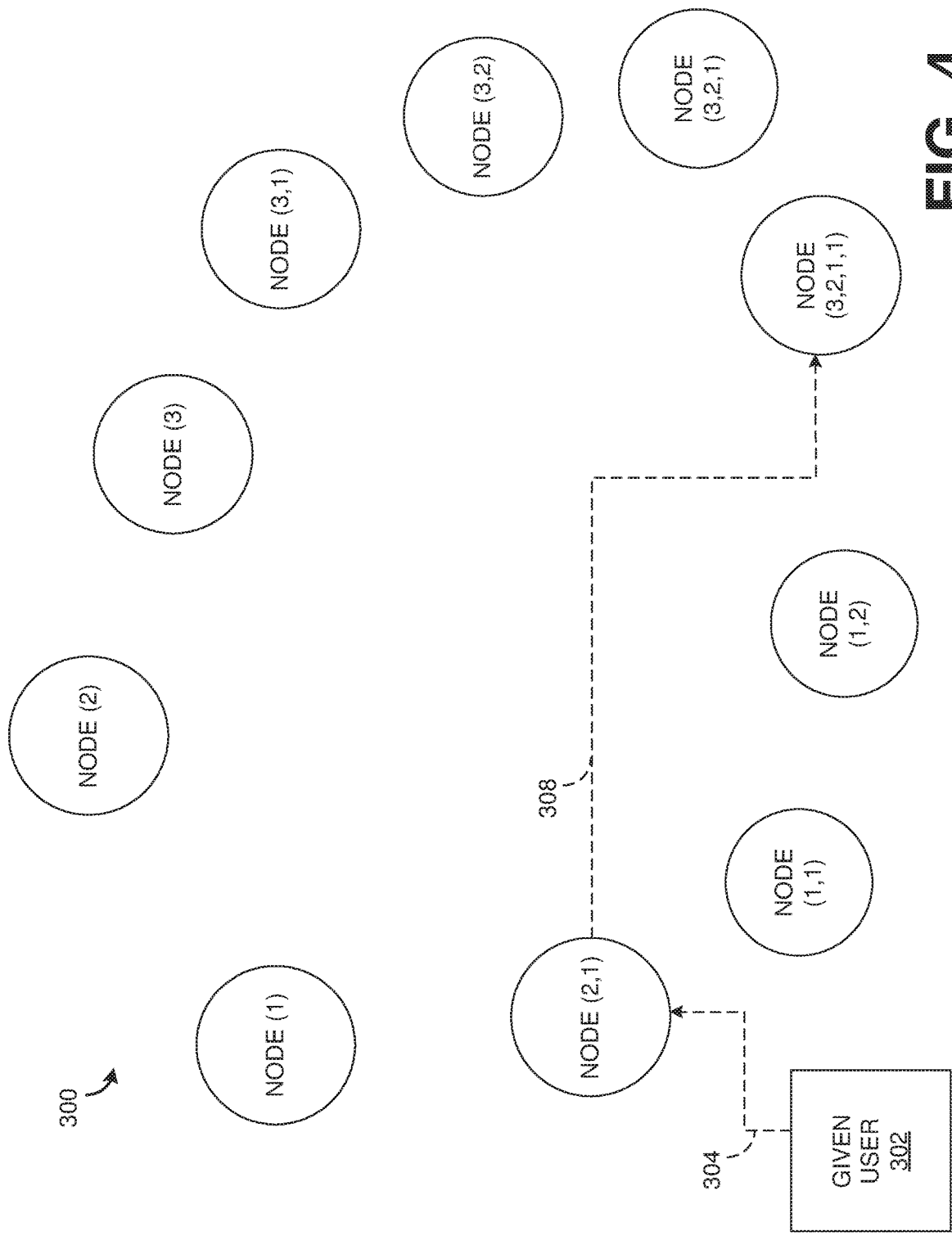
FIG. 4 illustrates the tree diagram of FIG. 3 arranged as a circular graph.

FIG. 4 illustrates the tree diagram 200 of FIG. 3 arranged as a circular diagram 300 to demonstrate how the category identifier 130 of FIG. 2 analyzes the commerce data 122 of FIG. 1. In the second example, a given user 302 is known to have executed the commerce stream for node (2, 1), as indicted by the arrow 304. The stream analyzer of FIG. 2 accesses the data associated with node (2, 1) to identify node (3, 2, 1, 1). Thus, the commerce stream for node (2, 1) (travel to Singapore in the second example) is a leading commerce stream for the commerce stream for node (3, 2, 1, 1), as indicated by an arrow 308.

Referring back to FIG. 2, in the second example, the category identifier 130 of the given DMP real time processing platform 104 identifies node (3, 2, 1, 1) as being a category of offers that may be of interest to the given user. Additionally, in some examples, the category identifier 130 can identify other categories that may be of interest to the user based on other criteria, such as the hierarchical distance between nodes of the trees 200 of FIG. 2. Further in some examples, the category identifier 130 can provide information identifying the category to the given web server via the network 112. In other examples, the category identifier 130 can forward the identified category to an offering server 140 via the network 112, wherein the offering server 140 can provide a specific offering for the given user, wherein the specific offering is a member of the category identified by the category identifier.

Further, the Q number of DMP real time processing platforms 104 can respond to requests for categories for a commerce stream in real time (e.g., within 50 milliseconds). Accordingly, the Q number of DMP real time processing platforms 104 can be implemented as lightweight computing platforms operating in parallel. More particularly, the memory 106 of the DMP real time processing platforms can include a category identifier 130. A category identifier 130 of a given DMP real time processing platform 104 can receive a request for a commerce stream from a given web server. The request for the commerce stream can include information characterizing a given user (e.g., data derived from a cookie). In some examples, the request can be an HTTP message that includes an HTTP header. In this situation, the HTTP header can include key value pairs that are employable to identify the given user. The category identifier 130 of the given DMP real time processing platform can analyze the user data 124 to identify a user profile for the given user. Moreover, the profile associated with the given user can include a first commerce stream executed by the given user. The category identifier 130 can access and analyze the commerce data 122 of the shared memory 114 to identify a category for a commerce stream that follows the first commerce stream. This identified category can be provided to an offering server or to the requesting web server so that an offering can be selected for the end user.

Employment of the DMP 100 allows enrichment to the taxonomy of categories. For example, as illustrated in FIG. 3, node (2, 2) and node (3, 2, 1, 1) are relatively distant on hierarchical basis (e.g., hierarchical distance of 4). However, in the second example, node (2, 2) and node (3, 2, 1, 1) may have a smaller quantified rank (e.g., a quantified rank of 2 in one situation explained). Thus, offerings can be tailored to the particular needs of users based on the user's execution of another commerce stream (e.g., a leading commerce stream).

Additionally, by bifurcating operations in the DMP 100 to preprocessing operations executed by the DMP preprocessing platforms 102 and the real time operations executed by the DMP real time processing platforms 104, delays in processing the request for the categories can be curtailed. More particularly, operations for the DMP real time processing platform 104 can be completed in a relatively small portion (e.g., 50 milliseconds or less or up to about 2.5%) of a user interest time window (e.g., about 2 seconds). Stated differently, the DMP real time processing platform 104 can respond to requests for a category within about 50 milliseconds (e.g., 20-30 milliseconds in some examples). Furthermore, by implementing multiple instances of the DMP real time processing platform 104, the DMP 100 can be scaled to process nearly any number of such requests (e.g., thousands or millions of contemporaneous requests).

As explained, the DMP real time processing platform 104 completes operations within 50 milliseconds (e.g., 20-30 milliseconds). This implies that the operations of a given DMP real time processing platform 104 authenticates, parses, and translates the requests for categories for a commerce stream. There may be thousands or millions of end-user devices that make contemporaneous requests for web pages. Each user of such end-user devices are part of an overall user space. Components, of a backend system, such as the DMP 100 can assist subscribing web servers to provide offerings in campaigns based on the set of categories that are ingested.

The computational time needed for a campaigns of offerings may be in the order of O(user*categories*offerings) in Big O notation. In some examples, there may be millions or even billions of users compared to hundreds of thousands of categories of offerings, and there may be thousands of offerings available. In such examples, there is momentous complexity in selecting offerings for users, particularly in situations where the selection needs to be made in 50 milliseconds or less to avoid expiration of the user interest window. Accordingly, as described with respect to FIGS. 3 and 4, the tree of categories are preprocessed, parsed and translated in the shared memory 114. Similarly, the categories of offerings are preprocessed by the taxonomy analyzer 126 of the DMP preprocessing platforms 102 through a mapping between categories in the commerce data 122. Accordingly, the shared memory 114 provides subsequent access by the DMP real time processing platforms 104 to provide a suitable offering for a user without excess computational time that might cause the user interest window to expire.

Figure 5:
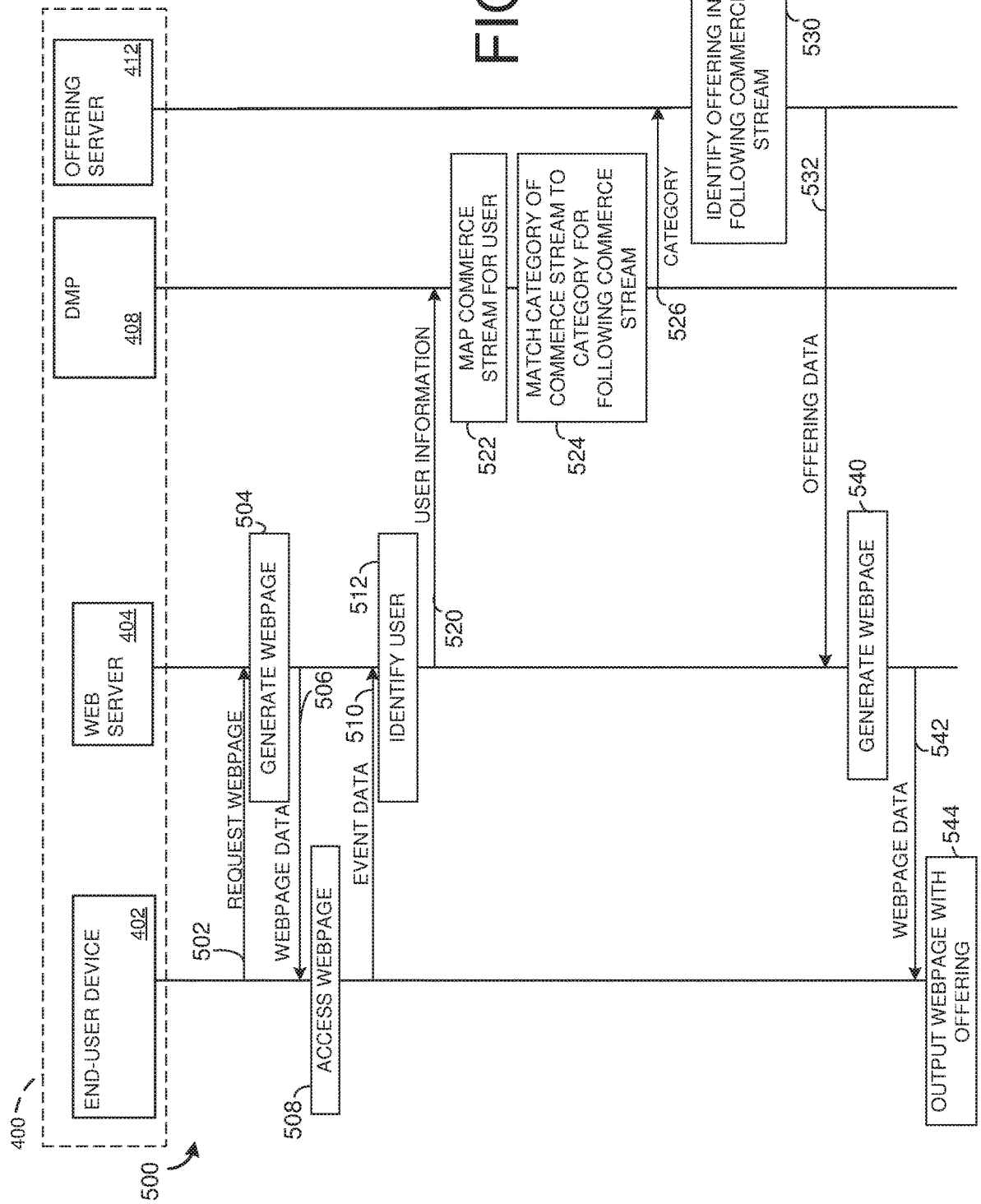
FIG. 5 illustrates a timing diagram of a system employing enriched taxonomy of categories for offerings to elevate relevance of targeted offerings to a user employing an end-user device.

FIG. 5 illustrates a timing diagram depicting an example of a timing of operations by a system 400 for executing a method 500 for providing an offering to a user. The system 400 can be implemented in a manner similar to the system 50 of FIG. 1. Thus, the system 400 can include an end-user device 402 (e.g., a computing platform). Additionally, the system 400 can include a web server 404 (e.g., one of the K number of web servers 56 of FIG. 1), a DMP 408 (e.g., the DMP 60 of FIG. 1 and/or the DMP 100 of FIG. 2) and an offering server 412 (e.g., the offering server 62 of FIG. 1 and/or the offering server 140 of FIG. 2). More particularly, operations of the DMP 408 can be executed with an instance of the DMP real time processing platform 104 of FIG. 2.

In the method 500, as illustrated, it is presumed that the DMP 408 has stored commerce data representing many (e.g., hundreds, thousands or millions) of commerce streams executed by users of end-user devices, as described herein. Additionally, it is presumed that a user of the end-user device 402 has already executed a first commerce stream for a first category of an offering. Expediency is paramount when generating a webpage for the end-user device 402 that includes the offering. In particular, in order to avoid a decay in user interest, the end-user device 402 should provide the user with the offering within a user interest time window (e.g., 2 seconds) after a user has triggered an operation (e.g., selected a user actuatable feature on a web page). After the user interest time window expires (e.g., about 2 seconds), every second added amounts to an increasing tendency towards page abandonment by the user of the end-user device. Additionally, each time a web page is refreshed at the end-user device 402 the user interest window is paused and resets upon the user taking another action that would trigger a next refresh of the web page.

In the method 500 it is presumed that communications between nodes of the system 400 consume about 50 milliseconds (e.g., packet flight time). That is, each communication hop to generate the web page for the end-user device 402 consumes about 2.5% of the user interest time window. Accordingly, operations needed for the end-user device 402 to output the webpage to the user 64 are selected based on efficiency to curtail loss of interest by the user. Further, it is understood that in other examples, each communication could consume more or less time based on factors such as bandwidth and/or network architecture.

At 502, a user of the end-user device 402 can employ a web browser executing thereon to request a web page from the web server 404. At 504, the web server 404 can generate a web page. Generation of the web page at 504 may take the web server 404 up to about 1 second. At 506, webpage data is provided from the web server 404 to the end-user device 402. In this situation, the end-user device 402 is provided with the web page before the expiration of the user interest window.

At 508, the end-user device 402 accesses the web page (e.g., displays a webpage based on the webpage data). At 510, event data (e.g., a purchase signal) is provided to the web server 404 in response to user input. In this situation, a new user interest window is established. At 512, the web server 404 can attempt to identify the user of the end-user device 402, such as through a username and password login and/or data in a web cookie. The operations at 512 can consume about 50 milliseconds. At 520, user information characterizing the identified user is provided to the DMP 408. Thus, cumulatively, operations between 510 and 520 consume about 150 milliseconds (e.g., about 7.5%) of the user interest window.

The user information provided at 520 can be embedded in an HTTP message, such as in an HTTP header. In some examples, the user information can be implemented as key value pairs, such as the key value pairs described with respect to Table 1. At 522, the DMP 408 can access the user data in a shared memory to map the first category of the first commerce stream executed by the user of the end-user device 402. At 524, the DMP 408 can match the first category of the offering for the first commerce stream executed by the user to a second category for a second commerce stream. In this manner, the first commerce stream can be a leading commerce stream and the second commerce stream can be a following commerce stream. The operations at 522 and 524 can collectively consume up to about 50 milliseconds (e.g., 2.5%) of the user interest window. In fact, in some examples, the operations at 522 and 524 can consume 20-30 milliseconds. At 526, the second category for the following commerce stream can be provided to the offering server 412. The operations between 522 and 526 can consume about 100 milliseconds (e.g., about 5%) of the user interest window. Thus, between 510 and 526, about 250 milliseconds (e.g., about 12.5%) of the user interest window is consumed.

At 530, the offering server 412 can identify a specific offering for the user of the end-user device 402 based on the provided category. The operations at 530 can consume up to about 500 milliseconds. At 532, offering data that characterizes the offering is provided to the web server 404. In some examples, the offering server 412 may be an integrated component of the web server 404, such that the second category is provided from the DMP 408 at 526 to the web server 404. Accordingly, the operations between 530 and 532 can consume about 550 milliseconds (e.g., about 27.5%) of the user interest window, such that between 510 and 532, about 800 milliseconds (e.g., about 40%) of the user interest window is consumed.

At 540, the web server generates a webpage that includes a link for the offering (e.g., a link to a web page for purchasing the offering). The operations at 540 can take up to about 1000 milliseconds. At 542, webpage data is provided to the end-user device 402. At 544, the end-user device 402 outputs the webpage with the offering. The operations at 544 can consume up to about 50 milliseconds. Thus, the operations between 540 and 544 can consume about 1100 milliseconds (e.g., about 55%) of the user interest window. Therefore, operations between 510 and 544 consume about 1900 milliseconds (e.g., 95%) of the user interest window of 2 seconds (2000 milliseconds).

As is demonstrated through the operations between 510 and 544 of the method 500, many of the operations incur delays that are outside of the control of the DMP 408. Thus, the operations on the DMP 408 are selected to avoid contributing to delaying the outputting of the webpage by the end-user device 402 more than the user interest time window. Accordingly, operations selected in the DMP 408 and executed at 522 and 524 can be completed in under 50 milliseconds (e.g., 20-30 milliseconds), which accounts for about 2.5% or less of the user interest time window (e.g., 2 seconds).

As explained herein, in the operations at 522 and 524 that are completed in 50 milliseconds or less (e.g., 20-30 milliseconds), includes operations for authenticating, parsing, translated the category request into internal data structures. Thus, as demonstrated, other techniques for providing an offering that would incur more delay (e.g., machine learning algorithms), which would cause the user interest window of 2 seconds to be exceeded, thereby inducing a decay in user interest. In some examples, there can be thousands or millions of instances end-user devices 402 operating contemporaneously. Therefore, exceeding the user interest window could have disastrous aggregated effects on an advertising campaign.

Figure 6:
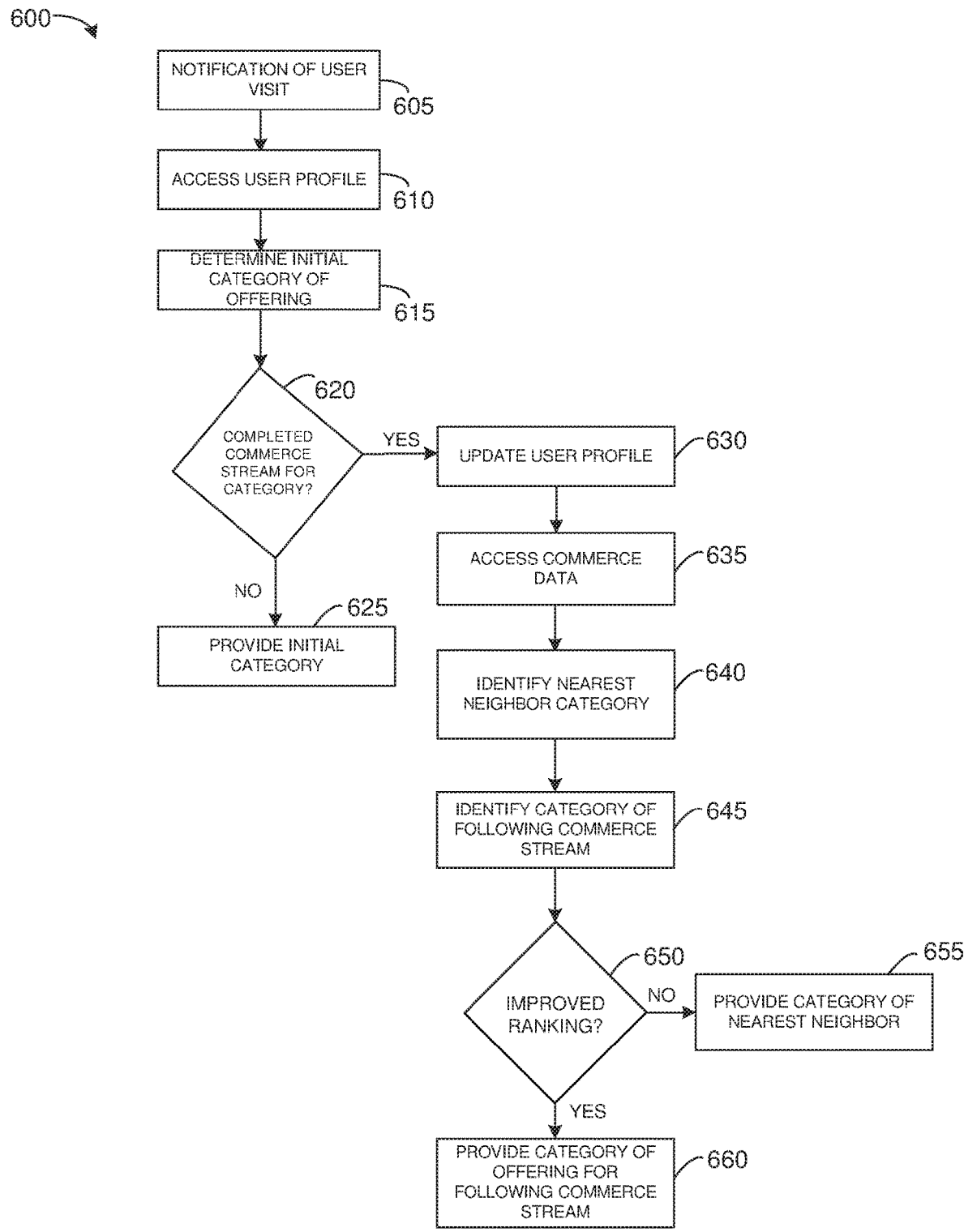
FIG. 6 illustrates a flowchart of an example method for enriching taxonomy of categories for offerings to facilitate generation of targeted offerings for a user.

In view of the foregoing structural and functional features described above, an example method will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 6 illustrates an example method 600 for determining a category for an offering of user based on the user's history of commerce streams (e.g., purchase history). The method 600 can be implemented by a DMP, such as the DMP 60 of FIG. 1, the DMP 100 of FIG. 2 and/or the DMP 408 of FIG. 5. More particularly, the method 600 can be implemented by a given DMP preprocessing platform 102 and a given DMP real time processing platform 104 of FIG. 2.

At 605, the DMP can receive a notification that a given user is employing an end-user device (e.g., the end-user device 52 of FIG. 1) to access a web server (e.g., the web server 56 of FIG. 1). The notification can be provided, for example, in an HTTP message. Additionally, IDs of the user can be embedded in an HTTP header of the HTTP message. For example, the IDs of the user can be implemented as key value pairs in the HTTP header, such as the key value pairs of Table 1. At 610, the DMP can access user data to retrieve a user profile for the given user. At 615, the DMP can map an initial category of an offering for the user. In some examples, the DMP may identify multiple initial categories of an offering for the user.

At 620, the DMP makes a determination as to whether the user has completed a given commerce stream for an offering that is a member of the initial category. Stated differently, at 620, the DMP determines if the user purchased (e.g., executed a commerce stream) for the initial category. If the determination at 620 is negative (e.g., NO), the method 600 proceeds to 625. If the determination at 620 is positive (e.g., YES), the method 600 proceeds to 625. At 620, the DMP 625 can provide the initial category to an offering server (e.g., the offering server 62 of FIG. 1, the offering server 140 of FIG. 2 and/or the offering server 412 of FIG. 5) and/or the web server.

At 630, the user profile for the user can be updated to reflect the execution of the given commerce stream. At 635, the DMP can access commerce data to retrieve a category profile for the category of the given commerce stream. At 640, the DMP can determine a nearest neighbor for the category associated with the completed commerce stream. Additionally, at 645, based on the commerce data, the DMP identifies a category for another commerce stream that follows execution of the given commerce stream. In such a situation, the given commerce stream is a leading commerce stream relative to the other commerce stream, which is a following commerce stream. At 650, the DMP can make a determination as to whether a ranking for the category associated with the following commerce stream is an improvement over a ranking for the nearest neighbor category. If the determination at 650 is negative (e.g., NO), the method proceeds to 655. If the determination at 650 is positive (e.g., YES), the method proceeds to 660. At 655, the DMP provides the nearest neighbor category of the offering server and/or the web server. At 660, the DMP provides the category for the offering of the following commerce stream to the offering server and/or the web server.

Specific details are given in the above description to provide a thorough understanding of the described examples. However, it is understood that the examples can be practiced without these specific details. For example, physical components can be shown in block diagrams in order not to obscure the embodiments in unnecessary detail. In other instances, well-known circuits, processes, algorithms, structures and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof. In one example, the DMP 60, the offering server 62 and/or the K number of web servers 56 of FIG. 1 can be implemented on one or more cloud servers and can be configured to receive feature sets for analysis from one or more client systems. Specifically, the DMP 60, the offering server 62 and/or each web server 56 can be implemented on a multi-tenant cloud services platform system such that multiple clients can log in to a central location to access a server or collection of servers, but where the specific access to data. For example, each client might be restricted from accessing data of other clients, and the multi-tenant cloud services platform system may keep track of how many resources (e.g., processor cycles, storage, or time spent using instances of cloud-hosted software applications) have been used by each of the clients, and bill the clients based on the resource usage.

Furthermore, embodiments can be implemented by hardware, software, scripting languages, firmware, middleware, microcode, hardware description languages and/or any combination thereof. When implemented in software, firmware, middleware, scripting language and/or microcode, the program code or code segments to perform the necessary tasks can be stored in a machine-readable medium such as a storage medium. A code segment or machine-executable instruction can represent a procedure, a function, a subprogram, a program, a routine, a subroutine, a module, a software package, a script, a class, or any combination of instructions, data structures and/or program statements. A code segment can be coupled to another code segment or a hardware circuit by passing and/or receiving information, data, arguments, parameters and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and/or various other storage mediums capable of storing that contain or carry instruction(s) and/or data.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine-readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices and magnetic storage devices.

What have been described above are examples. It is, of course, not possible to describe every conceivable combination of structures, components, or methods, but one of ordinary skill in the art will recognize that many further combinations and permutations are possible. Accordingly, the disclosure is intended to embrace all such alterations, modifications and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for identifying a category of offerings comprising:

receiving, by a data management platform (DMP) executing on a computing platform, user data for a user of an end-user device, wherein the computing platform comprises a non-transitory memory for storing machine readable instructions and a processor for accessing the non-transitory memory and executing the machine readable instructions;

storing, by the DMP, received user data in a shared memory, wherein the shared memory is accessible by at least one other DMP executing on the computing platform;

preprocessing, by the DMP, commerce data characterizing a plurality of executed commerce streams, wherein each executed commerce stream corresponds to a given offering ordered for a given category of offerings;

identifying, by the DMP, a temporal correlation between at least two categories of offerings based on the plurality of executed commerce streams;

mapping, by the DMP, identifiers (IDs) from received user data stored in the shared memory for the user to a plurality of different categories of offerings, wherein a particular category of offerings of the plurality of different categories of offerings corresponds to a leading commerce stream executed by the user, wherein the leading commerce stream corresponds to a first offering ordered by the user, wherein the category of offerings for the leading commerce stream corresponds to a node in a hierarchical tree that has a first parent node, wherein the hierarchical tree is preprocessed, parsed and translated in the shared memory by the DMP; and matching, by the DMP, the particular category of the leading commerce stream to a second category of offerings for a following commerce stream based on commerce data characterizing a plurality of commerce streams executed in a window of time, and the second category of offerings represents a node in the hierarchical tree that has a second parent, different from the first parent, wherein the first category and the second category have a hierarchical distance and a rank that calculated via preprocessing by the DMP and is based on the hierarchical distance and percent of users that executed both the leading commerce stream and a second commerce stream of the plurality of commerce streams that included an offering corresponding to the second category; and providing, by the DMP, the second category of offerings for the following commerce stream, wherein the DMP provides the second category of offerings for the following commerce stream within 50 milliseconds of receiving the user data for the user of the end-user device.

2. The method of claim 1, wherein the IDs in the received user data are embedded in a Hypertext Transfer Protocol (HTTP) header provided to the DMP.

3. The method of claim 2, wherein the IDs are embedded in key value pairs of the HTTP header.

4. The method of claim 1, further comprising:
identifying, by an offering server, a particular offering that is within the second category of offerings; and
providing, by the offering server, the particular offering to a web server accessed by the end-user device.

5. The method of claim 4, further comprising:
generating, by a web server, an advertisement for the particular offering; and
providing, by the web server, the advertisement to the end-user device.

6. The method of claim 1, wherein the identifying comprises:
calculating a rank between each category of offerings based on the plurality of executed commerce streams.

7. The method of claim 6, wherein the temporal correlation between the category of offerings for the leading commerce streams and the category of offerings for the following commerce stream corresponds to a likelihood that the user will execute a commerce stream to order an offering in the second category of offerings based on the execution of the leading commerce stream.

8. The method of claim 1, wherein the first offering was ordered by the user within a time window defined by a length of the temporal correlation between the at least two commerce streams of the plurality of commerce streams.

9. The method of claim 1, further comprising:
matching, by the DMP, a third category of offerings for the user based on the particular category;
comparing, by the DMP, a rank of the third category of offerings to a rank of the second category of offerings; and
replacing, by the DMP, the third category of offerings with the second category of offerings.

10. The method of claim 1, wherein the leading commerce stream is a first of the plurality of commerce streams and the following commerce stream is a second of the plurality of commerce streams.

11. A data management platform (DMP) for identifying a category of offerings comprising:
a DMP preprocessing computing platform having a computer readable program stored in a non-transitory machine-readable medium that causes the program to:
receive user data for a user of an end-user device, wherein the received user data is stored in a shared memory that is accessible by at least one other DMP executing on a computing platform;
preprocess commerce data characterizing a plurality of executed commerce streams, wherein each executed commerce stream corresponds to a given offering ordered for a given category of offerings; and
identify a temporal correlation between at least two categories of offerings based on the plurality of executed commerce streams; and a DMP real time processing computing platform having a computer readable program stored in a non-transitory machine-readable medium, a non-transitory memory for storing machine readable instructions and a processor for accessing the non-transitory memory and executing the machine readable instructions that causes the program to:
map identifiers (IDs) from received user data stored in the shared memory for a user to a plurality of different categories of offerings, wherein a particular category of offerings of the plurality of different categories of offerings corresponds to a leading commerce stream executed by the user, wherein the leading commerce stream corresponds to a first offering ordered by the user, wherein the category of offerings for the leading commerce stream corresponds to a node in a hierarchical tree that has a first parent node, wherein the hierarchical tree is preprocessed, parsed and translated in the shared memory by the DMP;
match the particular category of the leading commerce stream to a second category of offerings for a following commerce stream based on commerce data characterizing a plurality of commerce streams executed in a window of time, and the second category of offerings represents a node in the hierarchical tree that has a second parent, different from the first parent, wherein the first category and the second category have a hierarchical distance and a rank that is based on the hierarchical distance and percent of users that executed both the leading commerce stream and a second commerce stream of the plurality of commerce streams that included an offering corresponding to the second category; and
provide the second category of offerings for the following commerce stream wherein the DMP provides the second category of offerings for the following commerce stream within 50 milliseconds of receiving the user data for the user of the end-user device.

12. The DMP of claim 11, wherein the IDs in the received user data are embedded as a key value pair in a Hypertext Transfer Protocol (HTTP) header provided to the DMP real time processing computing platform.

13. The DMP of claim 11, wherein the temporal correlation between the category of offerings for the leading commerce streams and the category of offerings for the following commerce stream corresponds to a likelihood that the user will execute a commerce stream to order an offering in the second category of offerings based on the execution of the leading commerce stream.

14. A method for identifying a category of offerings comprising:
preprocessing, by a data management platform (DMP) executing on a computing platform, commerce data characterizing a plurality of executed commerce streams, wherein each executed commerce stream corresponds to a given offering ordered for a given category of offerings, wherein the computing platform comprises a non-transitory memory for storing machine readable instructions and a processor for accessing the non-transitory memory and executing the machine readable instructions;
identifying, by the DMP, a temporal correlation between at least two categories of offerings based on the plurality of executed commerce streams;
receiving, by the DMP, user data for a user of an end-user device;

storing, by the DMP, the user data for the user of the end-user device in a shared memory, wherein the shared memory is accessible by at least one other DMP executing on the computing platform;

mapping, by the DMP, identifiers (IDs) from received user data stored in the shared memory for the user to a plurality of different categories of offerings, wherein a particular category of offerings of the plurality of different categories of offerings corresponds to a leading commerce stream executed by the user, wherein the leading commerce stream corresponds to a first offering ordered by the user, wherein the category of offerings for the leading commerce stream corresponds to a node in a hierarchical tree that has a first parent node, wherein the hierarchical tree is preprocessed, parsed and translated in the shared memory by the DMP;

matching, by the DMP, the particular category of the leading commerce stream to a second category of offerings for a following commerce stream based on commerce data characterizing a plurality of commerce streams executed in a window of time, and the second category of offerings represents a node in the hierarchical tree that has a second parent, different from the first parent, wherein the first category and the second category have a hierarchical distance and a rank that is based on the hierarchical distance and percent of users that executed both the leading commerce stream and a second commerce stream of the plurality of commerce streams that included an offering corresponding to the second category; and providing, by the DMP, the second category of offerings for the following commerce stream to an offering server, wherein the offering server provides a particular offering that is categorized in the second category to a web server accessed by the end-user device, wherein the DMP provides the second category of offerings for the following commerce stream to the offering server within 50 milliseconds of receiving the user data for the user of the end-user device.

15. The method of claim 14, wherein the IDs in the received user data are embedded as a key value pair of a Hypertext Transfer Protocol (HTTP) header provided to the DMP.

16. The method of claim 1, further comprising:

determining, by the DMP, whether the rank is an improvement over the hierarchical distance between the first category of offerings and the second category of offerings, wherein the DMP provides the second category of offerings for the following commerce stream based on the determination.

* * * * *

UNITED STATES PATENT AND TRADEMARK OFFICE
CERTIFICATE OF CORRECTION

PATENT NO. : 11,501,340 B2  
APPLICATION NO. : 16/940656  
DATED : November 15, 2022  
INVENTOR(S) : Haldar et al.

Page 1 of 1

It is certified that error appears in the above-identified patent and that said Letters Patent is hereby corrected as shown below:

In the Specification

In Column 7, Lines 8-9, delete "of the of the" and insert -- of the --, therefor.

In Column 12, Line 25, delete "AUTOMBILE" and insert -- AUTOMOBILE --, therefor.

In the Claims

In Column 22, Line 36, in Claim 11, delete "stream" and insert -- stream, --, therefor.

Signed and Sealed this  
Twenty-seventh Day of June, 2023

Katherine Kelly Vidal  
*Director of the United States Patent and Trademark Office*